(12) United States Patent
Sandberg-Maitland et al.

(10) Patent No.: US 10,673,626 B2
(45) Date of Patent: Jun. 2, 2020

(54) THRESHOLD SECRET SHARE AUTHENTICATION PROOF AND SECURE BLOCKCHAIN VOTING WITH HARDWARE SECURITY MODULES

(71) Applicant: SPYRUS, Inc., San Jose, CA (US)

(72) Inventors: William Sandberg-Maitland, Ottawa (CA); Burton George Tregub, Encino, CA (US)

(73) Assignee: SPYRUS, INC., San Jose, CA (US)

( * ) Notice: Subject to any disclaimer, the term of this patent is extended or adjusted under 35 U.S.C. 154(b) by 0 days.

(21) Appl. No.: 16/237,542

(22) Filed: Dec. 31, 2018

(65) Prior Publication Data
US 2019/0305938 A1    Oct. 3, 2019

Related U.S. Application Data

(60) Provisional application No. 62/650,856, filed on Mar. 30, 2018.

(51) Int. Cl.
| | |
|---|---|
| *H04L 9/08* | (2006.01) |
| *H04L 9/32* | (2006.01) |
| *G06F 16/182* | (2019.01) |
| *H04L 9/06* | (2006.01) |

(52) U.S. Cl.
CPC .......... *H04L 9/085* (2013.01); *G06F 16/1824* (2019.01); *G06F 16/1834* (2019.01); *H04L 9/0643* (2013.01); *H04L 9/0822* (2013.01); *H04L 9/321* (2013.01); *H04L 9/3247* (2013.01); *H04L 2209/38* (2013.01)

(58) Field of Classification Search
CPC ....... H04L 9/085; H04L 9/0643; H04L 9/321; H04L 9/3247; H04L 9/0822; H04L 2209/38; G06F 16/1824; G06F 16/1834
See application file for complete search history.

(56) References Cited

U.S. PATENT DOCUMENTS

| | | | |
|---|---|---|---|
| 9,300,639 B1 | 3/2016 | Roth et al. | |
| 9,742,561 B2 * | 8/2017 | Perretta | ................. H04L 9/0643 |
| 10,095,549 B1 * | 10/2018 | Needham | .............. G06F 9/5055 |
| 10,305,886 B1 * | 5/2019 | Ganesan | ............. H04L 63/0823 |

(Continued)

FOREIGN PATENT DOCUMENTS

| | | |
|---|---|---|
| WO | 2016130030 A1 | 8/2016 |
| WO | 2017006134 A1 | 1/2017 |

OTHER PUBLICATIONS

International Search Report and Written Opinion of the ISA/US, dated Jun. 21, 2019, PCT/US2019/024504.
Search History, dated May 30, 2019, PCT/US2019/024504.

*Primary Examiner* — Michael R Vaughan
(74) *Attorney, Agent, or Firm* — Robert J. Rose; Law Office of Robert Rose

(57) ABSTRACT

For an encryption-protected decentralized and replicated blockchain file storage system maintained and managed by a channel of peers, the invention creates the additional levels of trust that are needed for peer voter authentication and transaction proposal endorsement. The invention effectively excludes hostile agents from influencing or impersonating legitimate voter peers through the mathematical strength of the K-of-N mechanism based on secret sharing with cryptographic hashing. In a further embodiment an extension to nested signatures is disclosed to enforce signing order.

7 Claims, 9 Drawing Sheets

(56) References Cited

U.S. PATENT DOCUMENTS

| | | | |
|---|---|---|---|
| 2006/0023887 A1* | 2/2006 | Agrawal | H04L 9/083 380/277 |
| 2008/0263363 A1* | 10/2008 | Jueneman | G06F 21/32 713/184 |
| 2015/0244522 A1 | 8/2015 | Cheruvath et al. | |
| 2016/0205102 A1* | 7/2016 | Perretta | H04L 63/083 726/4 |
| 2017/0250972 A1 | 8/2017 | Ronda et al. | |
| 2018/0253451 A1* | 9/2018 | Callan | H04L 9/3239 |
| 2018/0351753 A1* | 12/2018 | Gardner | H04L 9/3278 |
| 2019/0028281 A1* | 1/2019 | Turissini | G06F 21/00 |
| 2019/0036914 A1* | 1/2019 | Tzur-David | H04L 63/0838 |
| 2019/0058696 A1* | 2/2019 | Bowman | H04L 63/0428 |
| 2019/0074962 A1* | 3/2019 | Ateniese | G06F 16/1805 |

* cited by examiner

300

$H\{H(\mathcal{S})\ ||\ Obj_{ID}\ ||\ SendingPeer_{ID}\ ||\ ActionReq_{ID}\ ||\ nonce\}$

*Fig. 3*

THRESHOLD SECRET SHARE
AUTHENTICATION PROOF AND SECURE
BLOCKCHAIN VOTING WITH HARDWARE
SECURITY MODULES

This application claims the benefit of and incorporates by reference the text of U.S. Provisional Patent Application No. 62/650,856, filed Mar. 30, 2018, titled "New Credentials For Secure Blockchain Voting And Authentication."

FIELD OF INVENTION

The field of the invention is authentication using secret shares mediated by a hardware security module.

BACKGROUND

Classically, commerce involving the transfer of goods or services among people required bi-lateral agreements. Consent to such agreements needed to be recorded and preserved typically with pen and ink signatures. With the advent of electronic commerce, a more robust electronic scheme became available, but suffers from the ease of impersonating one or more of the parties. In analogous fashion, voting in political elections has traditionally been done by pen and ink marking of ballots. Electronic voting in elections promises more participation of the electorate, but also suffers from the ease of impersonating one or more of the voters. As used in this disclosure, "voting" refers to any type of endorsement: whether it entails the casting of votes in an election, the giving of consent to a transaction or contract, or otherwise. The party voting is referred to as a "peer," the communications between peers takes place in a "channel," and the process is mediated and facilitated by a "repository."

Nations have always relied upon the existence of a central trusted organization, such as banks, clearing houses, exchanges, and election boards which were designed to be a trusted third party accepting legal, financial and regulatory liabilities, to facilitate the collection of votes and confirm the exchanges of assets or election of political candidates.

As the transaction systems moved from face-to-face personal physical transactions among known reliable parties to the use of private networks and then to the Internet for network-based electronic communications, there was always the possibility for someone to corrupt the systems intentionally, accidentally, or through reckless disregard, causing catastrophic consequences.

Public Key Infrastructure (PKI), hashing algorithms, and symmetric key cryptography solutions are the fundamental cryptographic technologies that provide the essential security backbone for use by blockchain systems. Well known to cryptographic practitioners in the art, PKI trusted third party certificate authorities issue digital identity public key certificates as credentials to devices or humans, after vetting the certificate recipient to verify authenticity against a set of policies and criteria agreed to by the recipient's organization through a Certificate Practice Statement or similar binding vehicle. Human or device peers, through programmatic processes, create unique public key pairs and symmetric encryption keys that are used in the authentication and encryption processes in conjunction with the digital certificates created by the certificate authority.

These technologies are widely used by enterprises today to provide strong authentication and data encryption credentials for private and shared environments and therefore fulfill the needs of blockchain environments. With the reliance on the private keys used in digital signatures to ensure integrity of data and trust in the identity of the peer senders, and for sharing encrypted data to authorized authenticated parties, it is critical that key management functions such as symmetric and public key pair generation and related cryptographic parameters be protected to enforce an absolute reliable trust model for data access and confidentiality whether stored within the blockchain or in data repository or archive storage.

The most general underlying scheme is that of the distributed autonomous organization or industry consortium application model that can be implemented as a software dapp with supporting backend smart contracts. This common dapp is accessible to all peers of the channel. Repositories may contain secure storage in a centralized architecture, or storage can be maintained by a decentralized collection of storage media, or a secure interface to an encrypted cloud storage. Secure storage media receive and distribute only encrypted data assets and do not store, and therefore cannot distribute, the data encryption keys. Currently available systems, including IP rights management systems such as the Azure Rights Management System ("RMS") can be interfaced to provide this service. Collectively, these distributed storage locations may be referred to as part of "the repository."

Externally, there is the collection of peer users or automated devices that belong to the channel and potentially have access to the encrypted assets that include create, modify and delete access modes. As will be described, these peers (or an enabled subset of them) function as the decision makers that dynamically determine the access control capabilities extended to other requesting peers. Within that outermost ring there is the collection of network client computers, and in a preferred embodiment, each is connected to a designated live drive such as a SPYRUS® Windows To Go drive containing an integrated hardware security module (HSM). In that embodiment the drive supports a bootable image of an operating system and the HSM supports the cryptographic functions, and the enabling applications reside on the bootable images of each node's HSM, as does the blockchain and virtual machine of the DLT. In alternative embodiments, the functions of the HSM and the live drive can be implemented in software, but as presented earlier, at great compromises to the security and integrity of the entire blockchain and in the trust of the identity of the peers.

For blockchain data confidentiality and integrity, transaction files and related data records that reside on physical sectors on a repository storage media require encryption to protect their contents from unauthorized disclosure, and processing with digital signatures to ensure integrity. Whether a system of such objects is distributed over a network or centrally shared among multiple authorized users distributed across a network, the issue of secure access mediation through cryptographic key sharing is an essential safeguard for the contents of the data objects under protection.

The security of data at rest and in motion have equal importance to the immutability of blockchain files in preserving the secure state of the system by ensuring that data is created, accessed and modified by authenticated authorized users only under tightly controlled keys that are available to those same authorized users only. While centralized data repository stores are discussed in the illustrated embodiment, it is possible to adapt the described solution to a decentralized autonomous organization (DAO) and related distributed systems based on blockchain technology.

The added protection of auditability is essential as a proof of secure state in the blockchain system. The Distributed Ledger Technology provided by blockchain main network providers enables a user or organization to ensure that a data object has not been created, accessed, modified or destroyed unless by an authenticated authorized peer known to the system. Actions on sensitive data must be permitted by an auditable consensual or voting process using modes of access approved by policy and verified by a minimum number of known and qualified agents. The linking of public DLT and secure data object storage is natural, but private blockchains derived from main networks are also appropriate for the requirements under discussion. The invention's voting mechanism is DLT-agnostic in that it is designed to work with public or private blockchain implementations that can be either consensus-based or not.

Systems which moderate such processes using blockchain software technology alone have the disadvantage that cryptographic keys and related cryptographic parameters are inadequately protected and the identity of qualified approving agents may be spoofed by hostile agents. Disclosure of blockchain cryptographic encryption or signing keys to attackers, or vulnerabilities from cybercriminal or competitive organization attackers can result in disablement or impairment of the auditability of the blockchain records that protect the system. Destruction of credentials also represents a threat to the system, resulting in impaired or a complete loss of availability of protected information assets.

Software and network interfaces attempt to protect the data objects and cryptographic keys and authentication data by conventional storage in standard software-based systems. But expert opinion still holds that hardware protection and storage of critical security parameters (CSPs) in hardware security modules such as the Rosetta® HSM produced by SPYRUS, Inc. of San Jose, represents the most secure protection for the data assets of the system. Rosetta® HSMs ensure absolute trust by securing cryptographic keys and identities in a hardware root of trust with FIPS 140-2 Level 3 certification which precludes their export or access by unauthorized devices, services or people and is recognized as an international standard of quality for protection.

The security and trust of the whole blockchain system depends on the security of the cryptographic parameters and key management. Cryptographic keys, initialization vectors (if applicable), authentication data such as passwords, passphrases and PINs require the most secure form of storage to ensure that the secure state of the system and its data contents are absolutely protected. Protection of the CSPs as well as the peer replication copy of the blockchain itself in mobile or portable environments can be provided by bootable live drives such as the Windows To Go' drives produced by SPYRUS, Inc. These FIPS 140-2 Level 3 drives include encrypted compartments for the blockchain, the operating system, blockchain applications and chaincode, other user or device/enterprise data, and include an integrated Rosetta® PKI smart card chip to support the symmetric and public key management functions required for blockchain security with a hardware root of trust. The hardware security module is the proven and globally accepted robust solution for the protection of security critical data.

An important characteristic of DLT systems is whether the system is permissioned or public (i.e., permissionless). Open-ended systems such as Bitcoin and Ethereum are permissionless. They are publicly available for use. A public DLT permits any peer or non-peer to read the blockchain, make changes to the blockchain that are permitted by policy and add correctly formed transactions or blocks to the blockchain. Any node can conduct transactions as well as take part in the consensus process to advance the blockchain.

If any of the foregoing operations are not universally permitted, the DLT is said to be permissioned to the extent of the controls imposed. Permissioned platforms such as Hyperledger Fabric and Multichain are aimed at consortiums or groups of member organizations where participation is close-ended. Advancing the blockchain is restricted to a fixed and approved set of peering nodes that are run by consortium members. Required permissions or privileges for peers to read, transact, add applications, change blockchain chaincode or contract components are defining attributes that characterize the DLT as permissioned. This is why it is critical that participating peers be trusted and authenticated, generally through digital identity public key certificates, and authorized with roles and permissions typically described in an attribute field of certificates or access control tables within a blockchain. Hence, because of these restrictions and controls regarding identification and privileges of peers, commercial systems which require auditability and strong authentication of peers are built around permissioned blockchain systems.

Another attribute of Distributed Ledger Technology that is important to achieve is consensus that all nodes in the network agree upon a consistent global state of the blockchain. Replication of state ensures that the blockchain is not lost if one or more nodes crash. A consensus mechanism is the process whereby a chosen or random group of network validators achieve agreement on the state of a ledger. Updating the replicated shared state happens according to predefined state transition rules defined by the state machine, the computing device upon which a blockchain executes, that is executed on all the replicas.

The state machine rules ensure that all nodes executing them with identical inputs, will eventually produce the same outputs. This results in eventual agreement on the change of any blockchain via the consensus protocol. The blockchain replicas also communicate with each other to build consensus and agree upon the finality of the state after a blockchain change is executed. In many public, and some private DLTs, a group of miners or validators mediate transactions from peers by forming a block that will be added to the blockchain.

For a consensus-based blockchain network, achieving consensus ensures that all nodes in the network agree upon a consistent global state of the blockchain. The invention described will work with both consensus-based and non consensus-based blockchains because it provides a new highly secure environment in which chosen voters or validators can come to agreement on the common updated state of all blockchain replicas. While in use, consensus-based mechanisms ensure that the nodes in the network collectively agree on a set of updates to the state of the blockchain, while allowing peer participation in the consensus process. For an encryption-protected decentralized and replicated blockchain file storage system maintained and managed by a channel of peers, an additional level of trust is needed for control and audit as the use of Distributed Ledger Technology blockchains becomes embedded within global commercial transaction applications ranging from finance to health care to trade. It is necessary to impose a permissioned mode of operation for file creation, modification and deletion. To this list may be added restoration of a deleted file, or movement of a file copy outside the system or publication of a file. This is particularly true for systems where ownership rests with the channel and not the individual peer. The advantages of a homogeneous K-of-N voting system is the secure and fair permissioned access that it affords the collective peer group without necessarily centralizing the repository storage.

Third party centralized services still dominate the digital economy and demand highly automated processes that may or may not be distributed over the Internet in the form of specialized servers, cloud storage sites and high-speed network components. With increasing velocity of the expanding global economies, the most centralized businesses, such as banks, transportation and shipping firms, and government services such as voting boards or customs and tax agencies, seek ways to reduce manual and hard-to-automate processes, and thereby eliminate bottlenecks. At the same time, however, it is important to provide a secure audit trail of all transactions, so that in the haste to eliminate bottlenecks there is no opportunity for fraud or deception.

Further, it is often necessary or desirable to enforce a specific order of voting. For example, in a commercial transaction between A and B, B may not want to vote and show consent until A does so first. In an election it may be desirable to limit casting of votes to situation where certain predicates are present.

What is needed then is a method for voting that authenticates the peer and provides a robust audit trail. It would be desirable that the method optionally allow for enforcement of voting order.

SUMMARY

The invention meets this need by providing a new method for strong authentication of peers through a new credential enabled by threshold cryptography schemes, coupled with decentralized storage locations that efficiently support audit requirements, protect sensitive data assets, and have no single point of failure. In a further embodiment the method can be extended to enforce voting order.

BRIEF DESCRIPTION OF DRAWINGS

FIG. 3 is an equation showing the algorithm for a K of N Authentication Proof credential.

DETAILED DESCRIPTION OF THE EMBODIMENTS

The methods of the invention will be described, together with optional embodiments. The optional embodiments are not meant to narrow the generality of the invention, which is usable with a broad range of devices, protocols, and circumstances.

Figure 1:
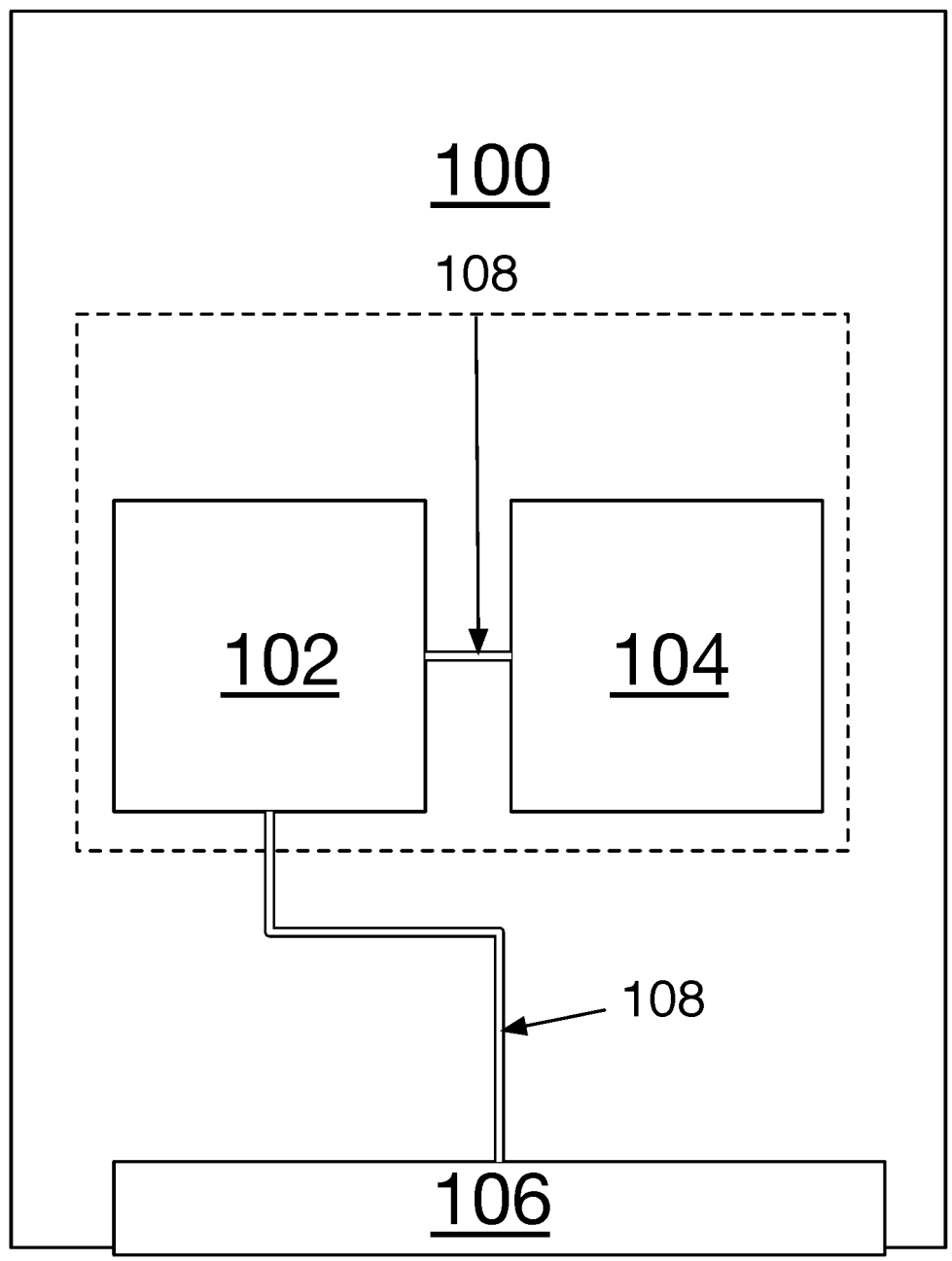
FIG. 1 is a schematic of the architecture of a Hardware Security Module useable with the invention.

With reference to FIG. 1, the method of the invention employs the power of a crypto-processor 102 built into a Hardware Security Module 100, to process a threshold secret sharing algorithm. A Hardware Security Module 100 ("HSM") is a physical computing device that safeguards and manages digital keys for strong authentication and provides crypto-processing and secure storage 104 (for keys and data at rest) both within a tamper resistant boundary. These modules traditionally come in the form of a plug-in chip or card, an external device that attaches directly to a computer or network server, or even an Application Specific Integrated Circuit ("ASIC") hardwired or plug inserted to a device or computer. Any form factor is possible for the HSM 100, including, for example, a plug-in thumb drive. Any manner of interface 106 can be used, such as USB, PCMCIA, etc. Any manner of bus 108 may be used so long as the keys and data in secure storage 104 and data moving on the bus 108 are protected from interception. An example of an HSM useable with the method of the invention is the Rosetta® hardware security module offered by SPYRUS, Inc., of San Jose, Calif.

The introduction and integration of a threshold secret sharing system generalizes and empowers decentralized authentication and consensus-enabling mechanisms. A threshold secret sharing scheme is an algorithm in cryptography where a secret $S$ (which is useable as a Master Key Encryption Key as explained below) is divided into N parts, giving each participant its own unique part, where some number K of the N parts, K≤N, are needed in order to reconstruct the secret $S$, hence the description "K-of-N." Schemes useable in the invention are described below. As used herein, voting and endorsement are to be understood as synonyms and species of consensus-enabling mechanisms, each used appropriate to the circumstances (e.g., voting for a candidate or endorsing a proposal or action), but both signifying consent.

Voting with a Threshold Secret Scheme

A threshold secret scheme enabled voting process provides channel-specific consensus enforcement. It also applies permission-based reasoning to each peer proposal. This mechanism is capable of performing beyond the purely formal aspects of correctness of the proposal transaction, extending to programmable meta-levels as well. These may include channel policy-based decisions such as: which peers are allowed to initiate new documents or, in the case of machine-to-machine peers, take new actions, which peers are able to read-access specific assets or modify them, and which projects are open to a specific peer for read, write or execute access, etc.

Role or attribute-based access control is well within the scope of mediation offered by a threshold secret sharing scheme. The decentralized autonomous organization or consortium employing these techniques can react and behave appropriately and with a level of sophistication that surpasses that offered by existing lower-level proof-of-work and related consensus mechanisms.

The K-of-N scheme can be applied to another highly relevant security problem as well, the matter of trusting the identity of the peer or voter. Use of a K-of-N solution to authenticate multiparty logon where a single user must enlist a minimum number of supporting independent shares in the local enclave is a further possibility. This solution is described in U.S. Pat. No. 9,742,561 to Perretta and Tregub, for "Secure Remote Authentication Of Local Machine Services Using Secret Sharing." In the current situation, where a K-of-N voting consensus is being created, one of the important essential credentials that a user's proposal contains is the assurance that the user in question has actually performed a secure logon to their HSM to be authenticated by presenting their identity certificate which can be verified by a root certificate authority.

Figure 2:
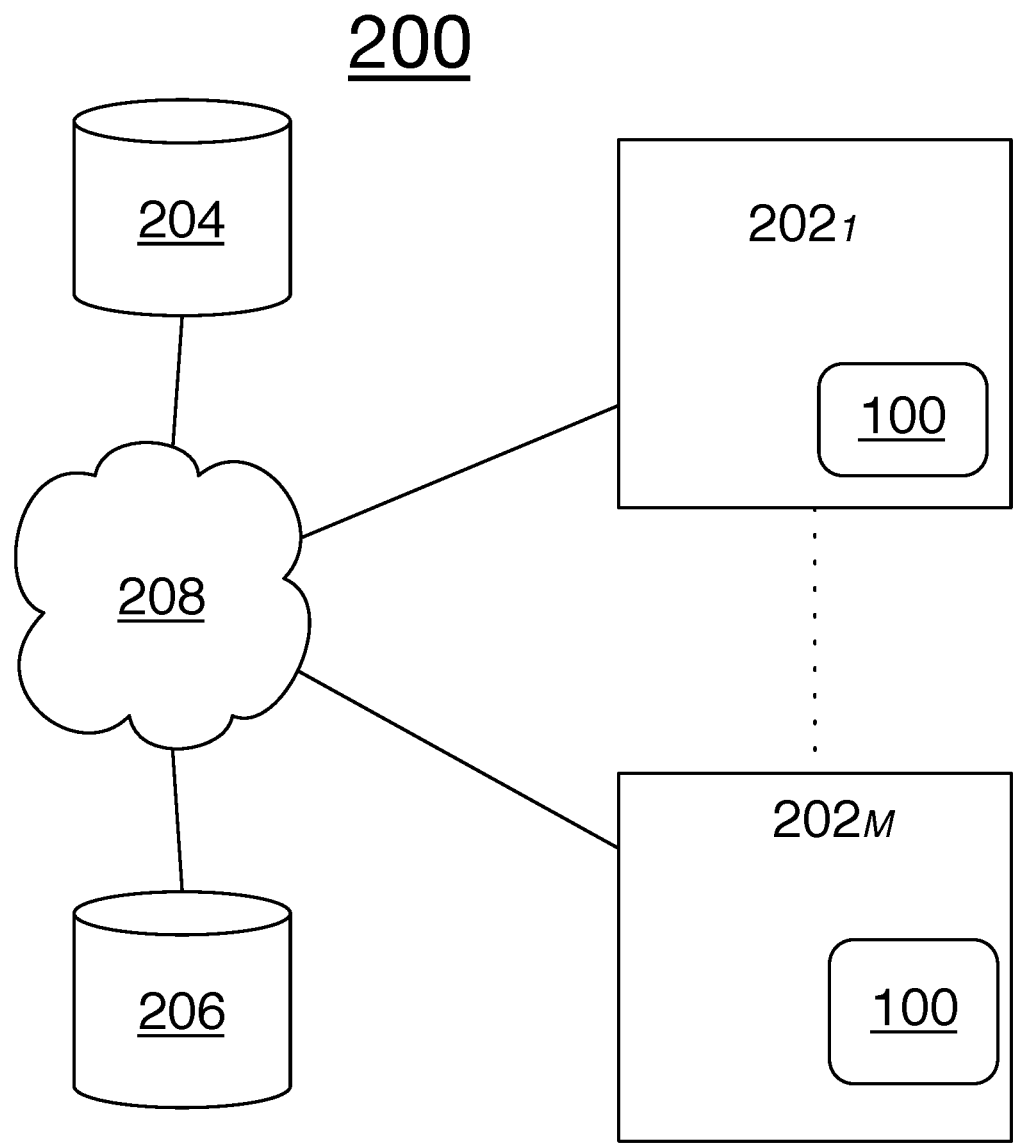
FIG. 2 is a diagram of the architecture of a channel.

With reference to FIG. 2, the method of the invention assumes that there is a set of M peers 202 (shown as $202_{1\ to\ M}$) each having an HSM 100 and belonging to the same K of N secret sharing crypto scheme in a channel 200, i.e., same shared secret $\mathcal{S}$, same N authentication factors (i.e., shares), where channel 200 is meant as a collection of M peers, perhaps within an enclave (not shown), a business entity, a governmental region, or other affinity group. This will be called a homogeneous authentication scheme over the channel. The structure is such that the K of N scheme is embodied within firmware into each HSM and that the actual value of the shared secret $\mathcal{S}$ is not disclosed by the trusted secure functionality of the HSM. Advantageously, the shared secret $\mathcal{S}$ may then be used as a Master Key Encryption Key ("MKEK"), or as a value from which the MKEK can be derived.

Each of the peers 202 has the same shared secret $\mathcal{S}$ in their HSM 100, which might be hard-wired at firmware load in secure storage 104, or, in a further embodiment, distributed to peers 202 after an authentication handshake. Similarly, each peer 202 stores its own share of the secret, and depending upon the implementation details, one or more of other shares in the channel. Optionally, a hash of the secret or share can be stored, or the crypto-processor 102 in HSM 100 might compute the hash function.

As will be known to those of ordinary skill in the art with reference to this disclosure, an MKEK is the top level key in a key hierarchy (also called a key chain). In other words, key chaining is a method of using multiple layers of encryption keys to protect data. A top layer key encrypts a lower layer key which in turn encrypts the data; this method can have any number of layers. As to terminology, a data encryption key ("DEK") would be a key used to encrypt data-at-rest, while a key encryption key ("KEK") would be a key used to encrypt other keys, such as DEKs or storage that contains further keys. As is evident, if the shared secret is used to wrap the DEK, the shared secret itself becomes the MKEK.

In case the structure of the channel changes with new or fewer members, the HSM firmware can be changed by an authorized authenticated trusted party or owner or operator of the channel and digitally signed by another trusted party so that the shared secret is maintained, thus maintaining the same secret but changing the values of the "K" factors.

In a threshold secret sharing scheme each of the peers may at any given time be authenticated by a minimum of K different authentication factors. They do not have to be authenticated using the same set of K factors, as long as each is a subset of the same N factors. Any secret sharing algorithm known to one of ordinary skill in the art of cryptography can be used. The most well known secret sharing scheme was developed by Adi Shamir, in which polynomials depending on the K factors are used to reconstruct the shared secret $\mathcal{S}$. In addition to the Shamir secret sharing scheme, one could also use Blakely's scheme which uses n hyperplanes as shares in a k-dimensional space. The intersection of the selected hyperplanes is a single point, which is the shared secret. Since a minimum of k hyperplanes are needed to intersect in a single point, each of at least k shares contributes towards calculating the shared secret point. If there are k or more shares, the point is still calculated, but if there are fewer than k, the intersection of the hyperplanes will be a line or plane or higher-dimensional subspace. Yet further examples are Mignotte's and Asmuth-Bloom's Threshold Sharing Schemes based on the Chinese Remainder Theorem, which calculates the solution of a set of equivalences to a set of constants modulo a sequence of coprime values.

K of N Authentication Proof

By analogy to a traditional voting scheme someone has to make a motion, nominate a candidate, offer a contract for approval. In the present invention, with reference to FIG. 2, it is assumed that peer $202_1$ has made such a proposal. It is desirable to have a credential which proves to each receiving voter (assumed to be peers $202_2$ through $202_M$, although the voting set of peers could be a subset of the M peers) that the proposing peer $202_1$ authenticated at their HSM using a K-of-N secret sharing logon process on an HSM that is sharing the same secret as that used by the voting peer. It allows the voting peer to verify and trust this fact and reject a proposal coming from a peer who may be impersonating a known member of the channel. It also prevents a rogue member of the channel from attempting to repudiate a previous proposal/action and claim to be the victim of impersonation.

With reference to FIG. 3, the credential required for this mechanism is called a K-of-N Authentication Proof ("KNAP") 300. As will be evident to one of ordinary skill in the art, KNAP 300 will typically be a numerical value (being the output of a secure hash function). The peer $202_1$ proposing the transaction (be it a vote, action, contract, etc.) must have previously logged on to their HSM 100 using the K-of-N authentication supported by HSMs in the channel.

Figure 4:
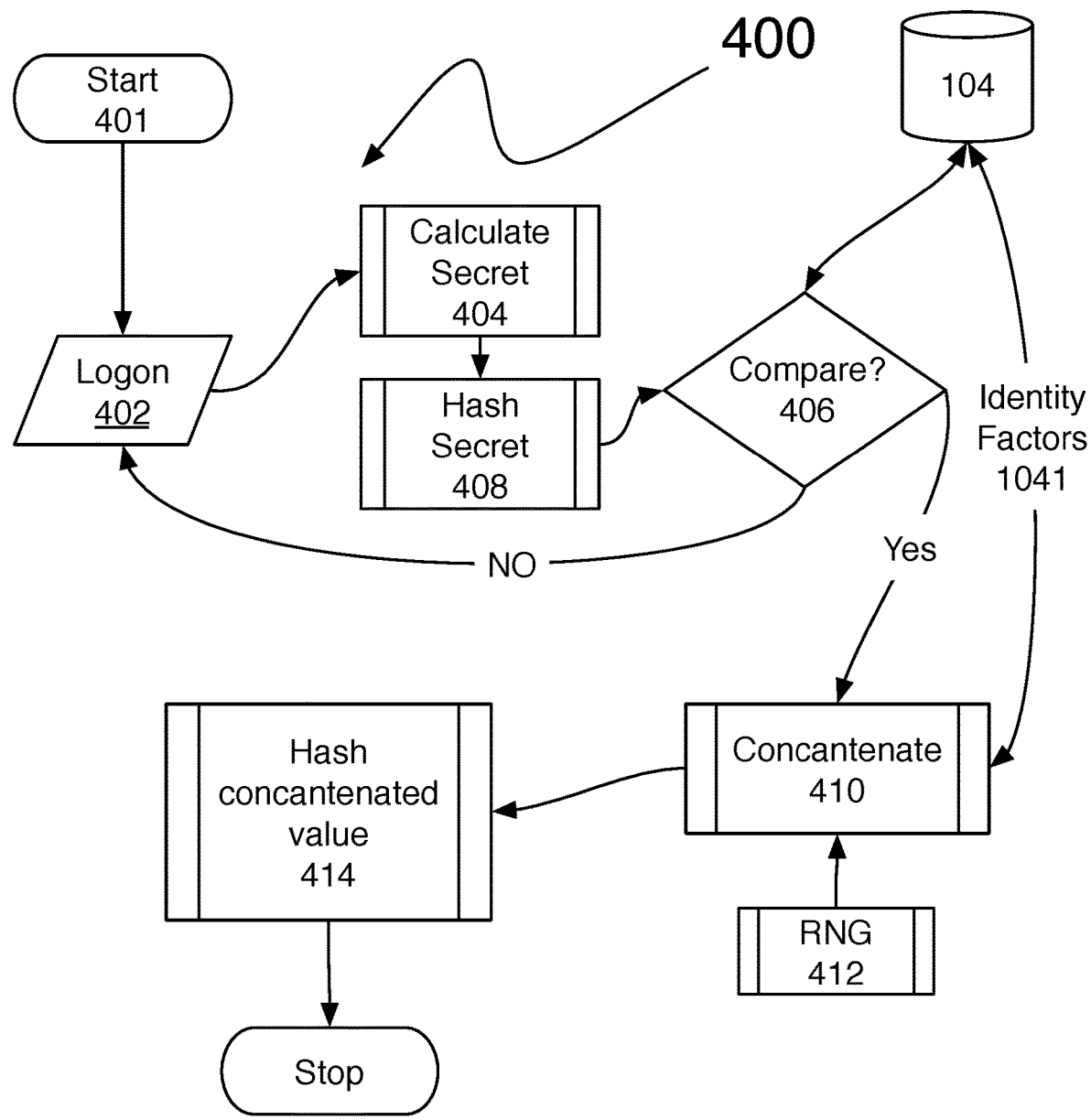
FIG. 4 is a flow chart diagram of a method to create the K of N Authentication Proof credential using the equation of FIG. 3.

The secret common to all HSMs in the channel is $\mathcal{S}$. Also as explained above, this shared secret value should not leave the HSM cryptographic boundary (shown in dashes lines in FIG. 1), but hashed forms of it $H(\mathcal{S})$ may be exported without disclosing the value itself. Expeditiously, with reference to FIG. 4, the method 400 of the invention starts 401 when the firmware embedded in HSM 100 contains a function that calculates 404 a secret from a logon 402, retrieves the shared secret from secure storage 104 and compares 406 the calculated secret with the stored shared secret and hashes 408 it, using secure storage 104 to hold these calculated values. Optionally, as will be known to one of ordinary skill in the art, and as shown in FIG. 4, the hash of the shared secret can be stored in secure storage 104, and the comparing step 406 takes place after the hash of the calculated secret is computed, the comparing step further comprising deleting the shared secret from the machine after the hash is computed. In either case the method returns to the logon step 402 if the values do not compare equivalently in step 406, and otherwise continues to step 410.

The method 400 to create KNAP 300 is separate from the described secret-sharing scheme used by voters for the endorsement of a proposal, and may have a different shared secret $\mathcal{S}'$. Likewise, the actual values of K and N for voting and HSM authentication may be distinct.

The hash $H(\mathcal{S})$ is further concatenated 410 with one or more identity factors 1041 retrieved from secure storage 104, such as in one embodiment the channel object identity ($Obj_{ID}$) being proposed for creation, modification or deletion, the peer identification ($SendingPeer_{ID}$) of the sender of the proposal, an action request factor ($ActionReq_{ID}$) and a nonce. The nonce must be a value never used previously, or subsequently, for this calculation. Preferably the nonce value will be generated by a validated random number generator (RNG) 412 inside the HSM boundary (optionally it might be part of the crypto-processor 102), but it is possible to import a globally maintained counter or RNG-generated value to function as the nonce. An action request factor (ActionReq$_{ID}$) is a code that denotes the action type proposed by the sending peer. This value could denote actions such as object creation, object modification, object destruction, read-only access of the object, read-write access to the object, and similar proposal actions. The concatenation of these values with the hash of the shared secret value is then itself hashed in step 414 to produce the KNAP 300 credential. The construction of the KNAP is summarized in the following formula (where || denotes concatenation and H is preferably a SHA-2 or SHA-3 hash (or some other one-way cryptographic hash function) of acceptable size in accordance with channel security policy):

$$KNAP = H[H(\mathcal{S}) \| Obj_{ID} \| SendingPeer_{ID} \| ActionReq_{ID} \| nonce] \quad \text{Eq. 1}$$

The correct use of the above KNAP credential by the proposing peer 202$_1$ is to send it as part of the message (perhaps as part of a message header) containing the proposal, along with the plaintext nonce and any desired identifiers to all voting peers. Thus, in one embodiment the proposal format has a header containing the tuple (Obj$_{ID}$, SendingPeer$_{ID}$, ActionReq$_{ID}$, KNAP, nonce) from which authentication is easily determined. When the voting peer receives the proposal message with the header as described, the values Obj$_{ID}$, SendingPeer$_{ID}$, ActionReq$_{ID}$, and nonce are extracted from it and used to recalculate the KNAP as described in the formula above. In this calculation the voter uses the hash of their own HSM shared secret stored in their secure storage 104 for authentication. (Or, alternatively, the hash of the shared secret alone could be stored) If the secret itself is stored, it does not need to leave the cryptographic boundary of the voter's HSM. The HSM firmware need only confirm that the new KNAP value agrees with the KNAP value received from the proposing peer in the message header. If this test succeeds, the proof of logon by the proposing peer is established. Otherwise, the proof fails, indicating that the proposing peer did not authenticate at an accredited HSM under the channel common K-of-N authentication process. It is also possible to simply export the hash of the shared secret $H(\mathcal{S})$ by way of a function in the voter's HSM, allowing the voter to perform the verification formula outside the HSM cryptographic boundary. Export of the strongly hashed shared secret does not compromise or disclose its actual value.

Using a Blockchain for an Audit Trail and to Enforce Policy

A blockchain, or Distributed Ledger Technology ("DLT"), is an immutable distributed ledger of values. Once a transaction is recorded in the blockchain it cannot be deleted or edited. It becomes a permanent auditable record for all eternity; it is a perfect audit trail. There is no trusted third party but instead a collective arrangement (the blockchain) is implemented and everybody in the collective has the same global transparent information. Hence, it becomes unnecessary for there to be a third-party central authority to mediate transactions.

A blockchain 206 that is useful for providing an audit trail in the invention is conventional and with reference to FIG. 2 preferably will be configured to provide access to data at rest in the channel repository 204. It is advantageous that such data at rest be encrypted using, for example, an XTS-AES-256 digital encryption key ("DEK"), and that the encrypted data itself, but not the key, is stored in secure storage at repository 204 (which may optionally be at multiple decentralized or centralized locations), with the blockchain 206 only containing a hyperlink to such data. In such a geometry any peer 202$_i$ might request access through a network 208 to the data and have a temporary copy downloaded and stored on its peer HSM. For example, it may be desired that there be a vote on a certain proposal, which preferably is to be kept confidential. The proposal itself would be "data at rest" and reside, in encrypted form, at the channel repository 204. The physical location or locations of channel repository 204 might be "in the cloud" but reachable over network 208 through a hyperlink and a Digital Encryption Key ("DEK") security wall.

As described above, a DEK is preferably encrypted with a MKEK on each peer HSM, which allows a security policy limiting all encryptions and decryptions to be performed on a peer HSM only. In that case DEKs never leave the network of HSMs and are not present in repository storage. A one-way hash of the DEK may be kept at the repository without having a copy of the DEK itself at that site: by comparing hash values adequate security may be maintained, as will be obvious to those of ordinary skill in the art of cryptography. A one-way hash of the DEK would be performed at the HSM and only that irreversible hash would be sent to the repository, the address of which would be stored in the blockchain. The HSMs, in cooperation with a blockchain, form a cryptographic access control layer for the channel architecture.

In a preferred embodiment the KNAP credential can be leveraged to provide authentication before the data at rest can be decrypted. There are an unlimited number of ways to implement this, but in each case decrypted data at rest will be unavailable to any peer 202 unless the KNAP credential 300 appropriate to that peer is present.

In a still further embodiment, if any peer requires access to the payload data, it must negotiate permission for that access with the other peers. A transaction securely records blocked read/write, modify or delete access and is proposed and written to the blockchain by the applicant peer. Following the endorsement process described below, the payload object is then downloaded to the applicant's bootable live drive with integrated HSM, decrypted and modified or processed as proposed in the peer's original request. For example, one of the voters asks to obtain read-write access to the payload, perhaps to make amendments. The HSM could be configured to have a second secret sharing scheme that would require K$_2$ shares (K$_2$>K) to recover a second secret that would be used to obtain the requested permissions for the payload. Here again, use of the KNAP credential could be leveraged to authenticate the peers.

In this further embodiment, on release of the blocked payload object, the applicant writes a release transaction to the blockchain making a record of the unblocking, then posts the modified payload object to its channel repository node, replacing the original encrypted copy which can be archived for audit purposes. The unblocked (or optionally re-encrypted) payload object is available for operational use by the next applicant peer that successfully accesses it.

Version control and backup of the payload information object is preferably carried out independently on the system on which it resides. If audit of the blockchain indicates that an infraction has occurred in rights access to the payload, the blockchain can be rolled back by authorized peers acting as verifiers and the last agreed version of the payload can be restored.

Endorsement refers to the process where specific peers execute a transaction and return a permission or denial response (e.g., a vote) to the peer client that generated the transaction proposal. Distributed applications, smart contract and chaincode applications may have corresponding endorsement policies, in which the endorsing peers are specified. A Hyperledger endorsement policy is a condition that determines what endorses a transaction, for example. Blockchain peers may have a pre-specified set of endorsement policies, which are referenced by a deploy transaction that installs specific chaincode. Endorsement policies can be parameterized, and these parameters can be specified by a deploy transaction.

To guarantee blockchain and security properties, the set of endorsement policies preferably should be a set of proven policies with limited set of functions in order to ensure bounded execution time (termination), determinism, performance and security guarantees. Dynamic addition of endorsement policies (e.g., by deploy transaction on chaincode deploy time) is sensitive in terms of bounded policy evaluation time (termination), determinism, performance and security guarantees.

The operation of the threshold secret sharing voting mechanism governs all access to the data objects protected by encrypted storage in the channel repository. No single peer has unpermissioned access to channel assets and assets within the framework are effectively beyond manipulation by a single entity. As explained above, leveraging the KNAP credential into the permissioned access rubric will provide a valuable authentication.

Voting privilege is either universally permitted throughout the channel by general policy, or voting privileges may be assigned by a centralized authority in the form of digitally signed attribute certificates. The distributed voting mechanism works as follows. A requesting peer sends a signed request message to all other peers in the channel to create, modify or delete a specified data object in the repository. The receiving peers act in a distributed autonomous way, assessing the request and verifying its digital signature. The blockchain chaincode or smart contract that they use can contain rules for granting specific kinds of access to specific requesting peers or types of peers, once again using authentication of the requesting peer by leveraging the KNAP credential. The successful verification of the requestor's signature is one such policy-bound requirement. While the object repository storage system is distributed, role based access and attribute based access control can be implemented in the contracts triggered by the voters.

As described, the issue of whether a peer can vote is determined on whether voting is a universal privilege or the would-be voter has been assigned a centrally controlled privilege, either scoped to all or some requestors or document or process types. Quantity quotas for voters may apply as well, i.e., a voter may use up their quota and thereby be disqualified to take part in subsequent voting until new quotas are distributed. By these mechanisms, voting on peer requests is either open to all receiving peers, or may be restricted to privileged peers who retain distributed quotas or blanket privileges by a central channel authority in accordance with policy.

If a vote either for or against the requestor peer's proposal is permitted by the privilege mechanism, the voter peer includes the following identification factors in their response: timestamp, the peer's unique secret share value, or hash thereof, sender's current voting privilege status, the identity of the requesting peer, identifier for the request, and vote outcome. A completed vote is a signed encrypted message that only the channel repository can decrypt. To ensure this, the voter and the repository may engage in a secure key agreement protocol such as Elliptic-curve Diffie-Hellman ("ECDH") or some similar protocol as will be obvious to one of ordinary skill in the art with reference to this disclosure. The ability of the repository to read and be assured of an individual vote's integrity is essential, and here too the KNAP credential can be used. An example of the type of enhanced protection that the vote must have is a cryptographic digital signature that is executed within the HSM to provide a trusted encrypted and cryptographically sealed data object.

When the repository front-end receives the initial peer's proposal and the votes from participating voters, the validation of the votes and decision is made to grant or deny the peer's proposal in an agreed reasonable time period. The decision mechanism involves a threshold computation on the entire set of votes received by the repository. If the shares received fail to reconstruct the shared secret of the threshold schema, the decision to reject the proposal is made. This outcome is due to an insufficient total response from voters or the presence of bogus votes that do not contain legitimate shares.

If the votes do pass this initial test, however, a positive vote count is made of the proportion of votes that support the proposal. In a preferred embodiment, if a simple majority of greater than 50 percent of positive votes in favor of the proposal is counted, then the repository commits to endorsing the proposal on behalf of the channel members, be it a file creation, modification or destruction action. Less than a simple majority of votes in support of the proposal in that case results in the repository rejecting the proposal. Regardless of outcome, a transaction record of the vote outcome is sent by the repository to the blockchain audit trail.

The back end of the repository node is a file object management service that can release and send files covered by the endorsement decision to the proposing peer. It can store newly created files and modified files received from the proposing peer, or mark files endorsed as deleted so that they remain invisible to the channel at large but can be recovered from a backup archive as live if a recovery proposal is endorsed through a later voting process.

The storage location of the encrypted file objects can be external to the repository system proper and could either be centralized in a cloud, a specialized data farm, or 'sharded', i.e., distributed over a decentralized storage platform and content distribution service such as Swarm, or the Interplanetary File System (IPFS). This decentralized approach has the additional security feature that the peers of the channel may contribute local storage space as needed and obviate the need to move encrypted file data through network connections to the channel repository node for secure storage. In this configuration, the repository system is functionally a decision node for finalizing the endorsement of peer proposals and interfacing to peers of the channel as a front end to the blockchain. Either approach, centralized or decentralized storage, provides a different set of security advantages and disadvantages depending on the reliability, backup and security posture of individual peer platforms versus those of a centralized facility.

Peers will typically, but not necessarily, be equally privileged, equipotent participants in a blockchain main network, which is a peer-to-peer network of nodes that can intercommunicate and interact with the blockchain itself. A peer may be an individual, set of individuals, automated machine object, or corporate node member of the blockchain network that can take part in the operations of the blockchain. For example, a blockchain can also enable smart devices to become independent agents, autonomously conducting a variety of transactions. The combination of blockchain and IoT will enable machines to order stock, operate during the most economical times, pay for the delivery of new items, and solicit bids from distributors, to name a few.

A channel is then a collection of peers able to collectively create, decrypt, modify and store sensitive information assets in encrypted form. A channel in this embodiment has a blockchain that can be either private to that channel, or a subset of a public main network that is commercially or otherwise provided. In either deployment, this blockchain will be often referred to as the channel ledger. Each peer of the channel will synch copies of the channel ledger with trusted channel peers, or a channel peer that centralizes the peer ledger for all other peers, and replicate its most current state on their platform. This process of "syncing" is a built-in function of blockchain technology and is a necessary process each peer platform performs on re-initializing their blockchain session.

A smart contract or chaincode is a peer-accessible collection of instructions stored on second-generation blockchains that functions much like a class in the sense of object-oriented computing. The concept of the smart contract stems from studies of algorithmic enforcement of agreements as a significant aid in human cooperation. Smart contracts allow peers, either human, services or automated machine devices to put instructions on the blockchain for later activation and use, with a guarantee of execution. Smart contracts are functionally used to facilitate the exchange of information content, cryptocurrency, services or anything deemed of value. They are binding in the sense that they cannot be modified or deleted, but can become dormant under user-programmable conditions.

All transactions between the peers belonging to the channel and the repository node to which they share access are submitted to the channel's distributed ledger technology ("DLT"). The channel DLT is a blockchain that can extend services beyond the confines of the channel and its member peers, but must contain all transaction records for events taking place in the channel. Data storage in a repository system is a logical concept and may be more virtual than actual since the repository node can act as a controlling decision engine for validating permissions and voting and the storage may be distributed securely to other physical media.

The concept of a channel is used here in a generic sense that allows for implementation through distributed applications (dapps) and smart contracts. The underlying communications system supporting the channel, its peers and protected assets can be implemented externally to the blockchain technology that governs its distributed ledger.

The scope of the various uses and applications of a blockchain can all be enhanced by use of the KNAP credential. The KNAP is a hardware-protected time-sensitive verification evidencing that the agent claiming to support a specific operation or action actually established the session using a proper K-of-N process, whether remote or local. The use of the invention allows a distributed set of HSM security nodes to create these credentials and send them to agents cooperating in the process.

A New Method for Encryption

For transactions electronically communicated among permissioned channel creators and receiving peers and channel repositories requiring privacy and confidentiality, a method of file encryption leveraging the KNAP credential is possible. Confidentiality of a data package comprised of a proposal package and the payload object files to which the proposal refers may be achieved by the creator peer using a file encryption of the data package with a symmetric key encryption algorithm, examples of which include XTS-AES-256 and U.S. Pat. No. 9,521,123B2 "Method for File Encryption", for creation of a data package transport encryption key uniquely derived from the hash of a shared secret.

The channel ordering service, authorized channel party, creator or originator peer creates databases which comprise lists of all members of all channels to which they belong, each database entry comprising an identifier for the member peer, an example of which is the members public key certificate issued by a Trusted Certificate Authority, a channel identifier denoting the channel or channels to which the peer belongs, and the public key of the member if a certificate is not furnished.

Figure 6:
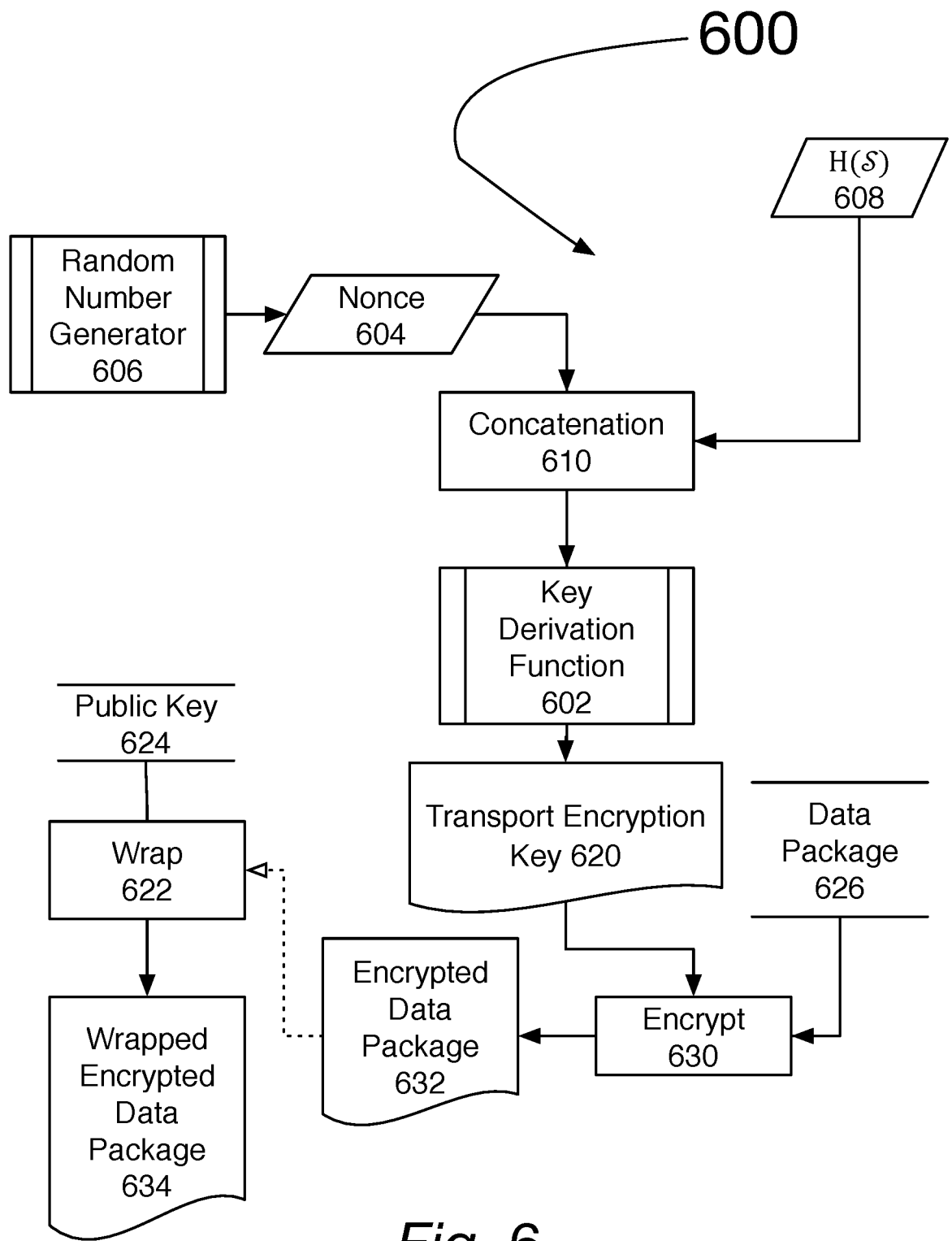
FIG. 6 is a flow chart diagram of a method of encryption useable with the invention.

With reference to FIG. 6, method 600 shows how a symmetric data package transport encryption key ("TEK") 620 may be derived using a strong key derivation function (KDF) 602, such as defined in NIST-approved SP 800-108, from the hash of the shared secret denoted $H(\mathcal{S})$ as extracted from the peer's KNAP credential where $\mathcal{S}$ is the shared secret held in common by all permissioned members of the particular channel to which the messages are being sent, and optionally combined with a PKI encryption. A nonce N 604 is generated by a random number generator 606 to make the key different for each data package transmission session, concatenated in step 610 with a hash of the shared secret 608 and used as the input into KDF 602 so that:

$$\text{TEK}=\text{KDF}(H(\mathcal{S})\|N) \qquad \text{Eq. 2}$$

where $\|$ represents a concatenation operation in Equation 2. TEK 620 may then be used to encrypt 630 the data package 626 yielding an encrypted data package ("EDP") 632 which is ready for transport, along with the nonce.

In an optional further embodiment also shown in FIG. 6, EDP 632 may be further secured by wrapping 622 it with the public key $K_{pub}$ 624 of a unique asymmetric public key pair owned by each of the recipient peers of the channel, yielding a wrapped encrypted data package ("WEDP") 634 which is sent, together with the nonce, to the peer associated with public key 624. This optional further embodiment insures that only the intended recipient can decrypt the data package, even if the originator mistakenly sends a message to the wrong channel member or if an attacker intercepts the message through, for example, a man-in-the-middle attack.

Figure 7:
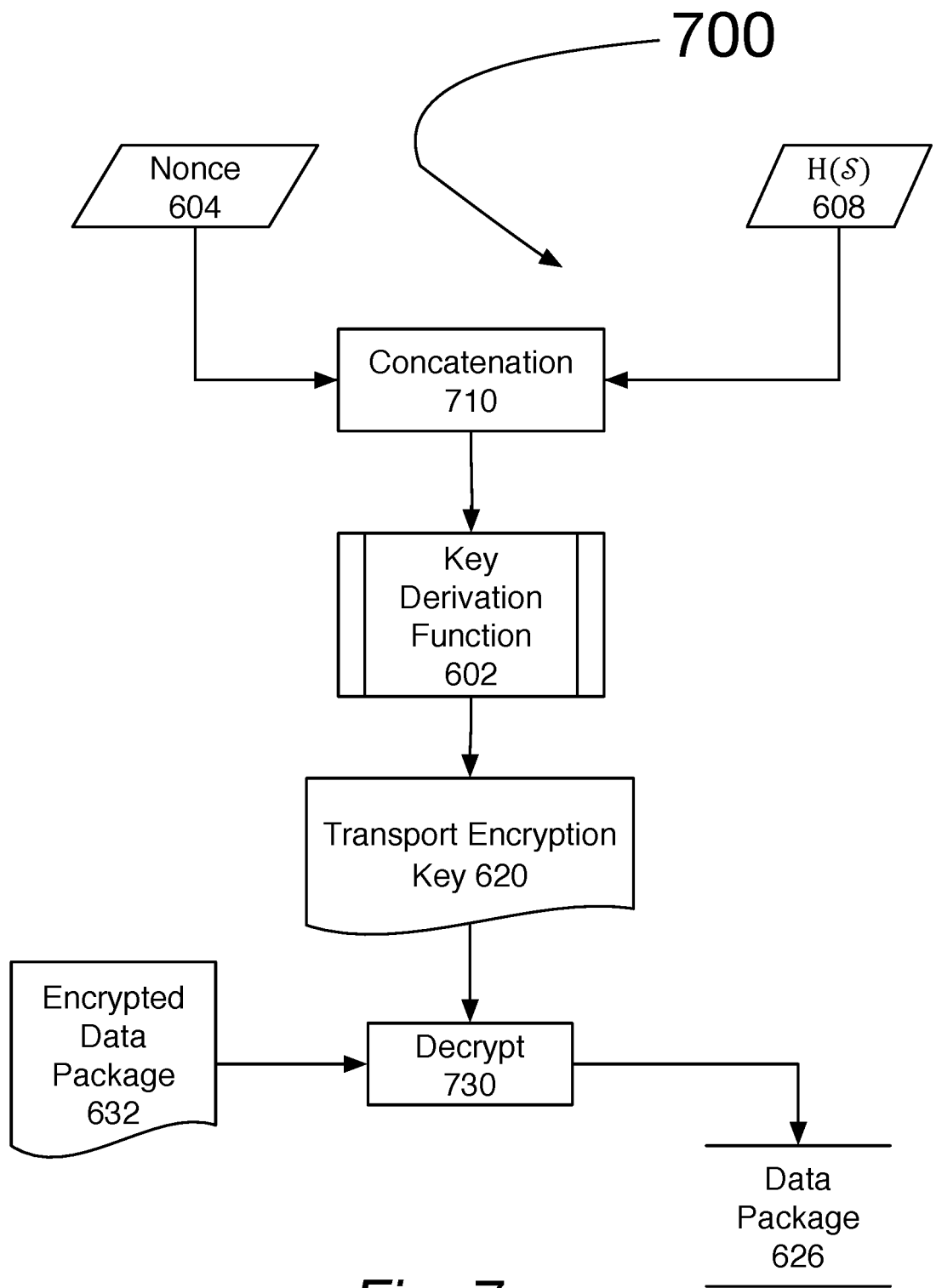
FIG. 7 is a flow chart diagram of a method of decryption useable with the invention.

The decryption process reverses this sequence which can only be successfully employed by authorized members of the channel that have possession of the shared secret. With reference to FIG. 7, method 700 shows a method to decrypt a received EDP 632. As in method 600, transport encryption key 620 is derived from the received nonce 604 and the hash of the shared secret 608. Since TEK 620 is symmetric it can be used to decrypt EDP 632, yielding a reconstituted data package 626.

Figure 8:
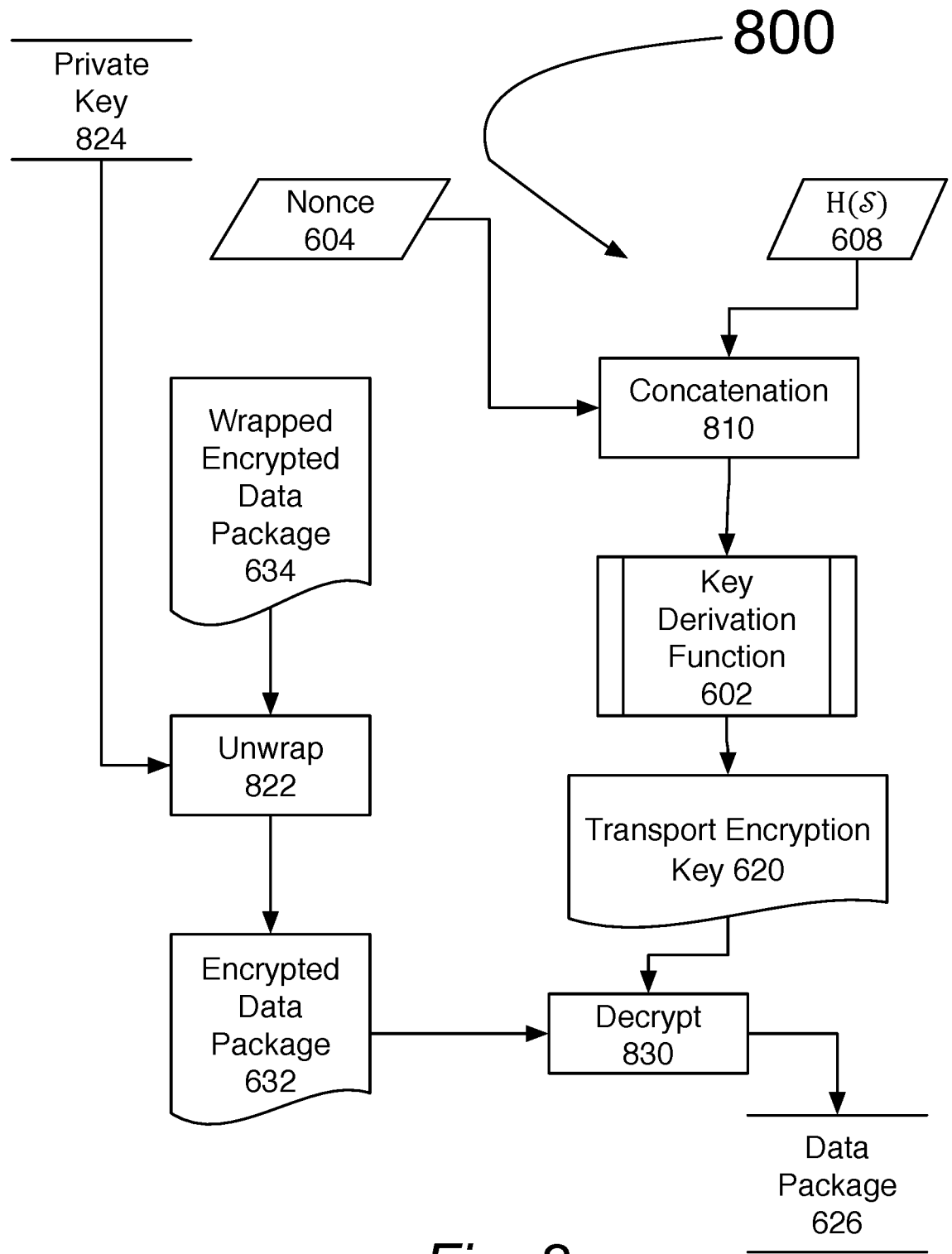
FIG. 8 is a flow chart diagram of a further embodiment of a method of encryption useable with the invention.

With regard to FIG. 8, if the option extension of method 600 has been used, and a WEDP 634 has been transmitted, along with nonce 604, method 800 is followed to decrypt. The recipient uses its private key 824 to unwrap WEDP 634, yielding EDP 632, whereupon method 800 follows the steps of method 700 to decrypt data package 626.

An alternative embodiment to maintain privacy and confidentiality communications among members of the channel and repository storage employs a network or repository server as a means of distribution of the encrypted data packages. The server then would also be configured to manage the database lists of channel members and their identification information.

The encrypted data packages are sent by the creator peer to the network server over a communications channel. When a proposal is advanced for a vote by the creator peer, for example, the recipient members are notified through some communications media of the availability of the data package at the network server. An example of a secure file sharing network server is the RES DISK virtual vault product offered by SPYRUS, Inc. of San Jose, Calif. in which a channel administrator sets the access controls for all channel members through the use of the members' digital certificates and full disk encryption is employed to add another layer of protection.

In one embodiment, the notified recipients then present their identification in the form of their public key or identification authentication public key certificate, and their channel identification, to query the server database for messages addressed to them. The server acknowledges the query, validates the member identification, for example by validating the public key certificate to the originating Certificate Authority. The server then sends the encrypted blobs unique to each authorized recipient. The recipients then follow the same procedure as described previously; when the recipients get the encrypted blobs each uses their private key to unwrap the public-key wrapped blob, then applies the nonce and the hashed shared secret represented in each peer's KNAP credential to regenerate the data package transport encryption key using the KDF to decrypt the data package.

The member recipient peers then review the decrypted data package for individual appropriate actions such as review, editing or voting. Only those channel member peers presenting authorizing private keys and the channel secret shares will be able to access and decrypt the contents of the data package upon retrieval.

Nested Signatures

In addition to these components there is a necessity to ensure that a final message signed by a prescribed number of authorities adheres to a specific order of signing, i.e., that the sequence of signing by specific agents is crucial to the acceptance of a nested signature message ("NSM"). Here too the KNAP credential is advantageous. A sequential list of signatures has no a priori structural assurance that a man-in-the-middle attack might not modify the sequencing in transit. However, the sequencing is effectively ensured by the construction of a nested signature. Should a rogue agent or attacker try to modify the sequence of signing, a different signature would, within the limits of the non-collision property of the signing algorithm's hash function, be obtained by permuting the order of signing in any way.

The vulnerability to man-in-the-middle attacks in communication networks poses a threat to the communicating parties and to those reliant on their business decisions. Interception of sensitive data assets can be managed through secure encryption technology, but defense of data integrity and proof of origin and policy enforcement requires more, notably where proof of remote multi-factor authentication is critical. A nested signature message ("NSM") allows sophisticated authentication credentials such as KNAP credential data to authenticate each participant's identity, and moreover securely establish whether that party's authentication was achieved in a remote enclave with a minimum of approval/endorsement requirements.

Secure digital authentication, also known as e-authentication, holds technical challenges that stem from the need to authenticate individuals or entities remotely over a network and answer basic questions as to the way in which order-dependent complex authentication events transpire over multiple domains and policies. The NSM mechanism is a secure vehicle of digital authentication that delivers knowledge of how authentication has been achieved in a dynamic network setting where strong hardware-based methods can be encapsulated and shared among all authorized players. The capability to deliver encrypted elements that can support K-of-N voting by authorized peers is an added assurance layer. The NSM process enhanced by the KNAP credential guarantees to the highest prevailing standards of digital authentication that confidence for user identities is preserved from initial sender to final receiver across the channel. In addition, it ensures that their often prioritized and order-mandated intentions are established and presented under strong hardware-based cryptographic safeguards.

Figure 5:
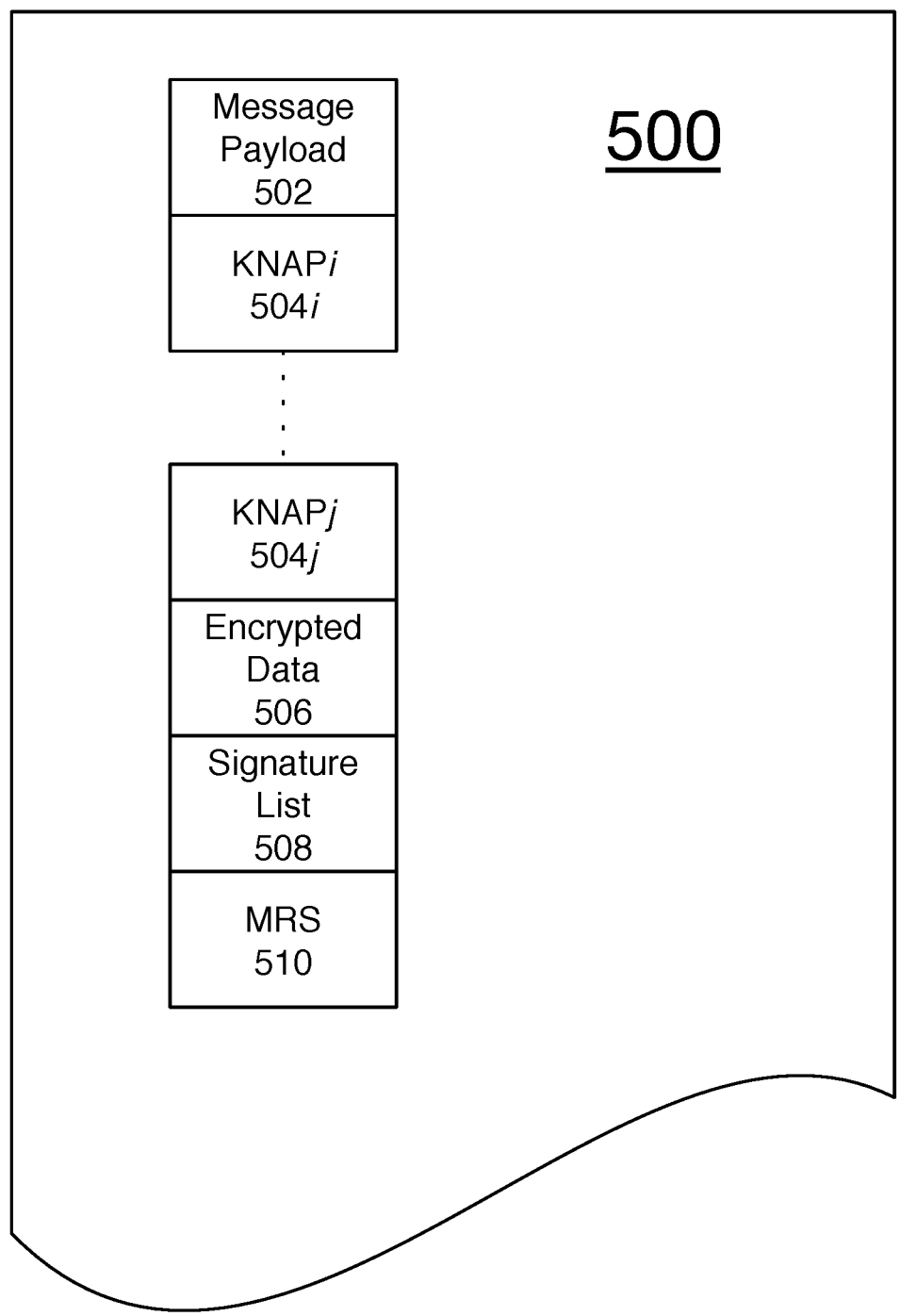
FIG. 5 shows the file structure of a Nested Signature Message useable with the invention.

With reference to FIG. 5, the field architecture 500 of a NSM using the invention is shown. Message payload 502 is the image content of the NSM, KNAP 504$i$ through 504$j$ are the KNAP credential for each peer that has signed the message and preferably each also contains each signing peer's identity. As the NSM makes it way to each peer the size of all 504 fields will grow by accretion. Encrypted Data 506 is optional encrypted information that may be encrypted in the public key of the final recipient or in an agreed symmetric key (optionally using method 600). Examples are shared secrets for a K-of-N authentication or an encrypted voting list. Signature List 508 is the set of nested signatures created by each successive recipient peer and appended to the end of the NSM prior to delivery to the next peer. MRS 510 is the "most recent signature" created by the last sender peer.

Figure 9:
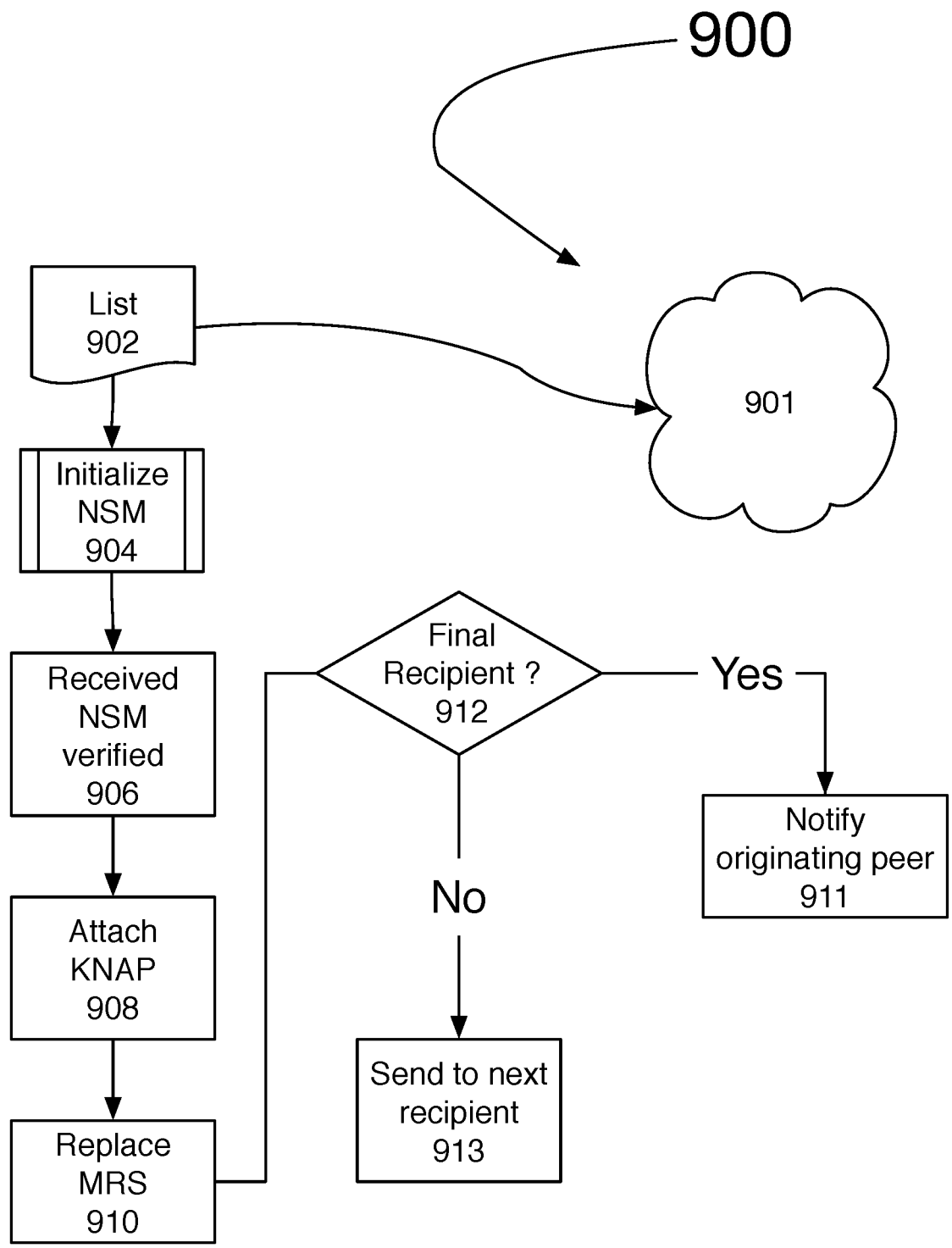
FIG. 9 is a flow chart of propagation of a Nested Signature Message useable with the invention.

With reference to FIG. 9, method 900 shows how the NSM scheme works. When a peer is the initiator of a new NSM that will be sent to other specific peers, optionally (as in step 901) a list of these successive recipients may be sent to each recipient of the NSM using an out-of-band notification. A list 902 of these specified peer identities is created to record the sequence and incremental states of NSM delivery. The NSM file with field architecture as shown in FIG. 5, is initialized in step 904. This will include the initial version of the list of accumulated KNAP credentials 504 contributed by other peers in the peer identity lists and is reserved for recording the sequence of peer nested signatures applied to the NSM instances that they receive.

When a peer receives a signed NSM that was sent from another peer in the channel, the NSM digital signature is verified 906. The agent identifies the message type as an NSM body by its header and format. The header contains an ordered list of the peers that must receive the NSM as it is sequentially propagated and forwarded to the specified peers in the order defined by the list. In an alternate embodiment, such list information can be communicated to those affected channel peers in an out-of-band communication.

The receiving peer parses the complete NSM body content according to the format specific to NSMs, with reference to FIG. 5, comprising the message payload and specific attachment of metadata and nested signatures. The message attachment comprises a sequence of fields. The first field 502 comprises a sequence of plaintext identifiers of all peer agents which have previously received the NSM and have augmented the metadata and attached a nested signature to it, and other message information. A second field 504 comprises a sequence of KNAP credentials 504$i$ through 504$j$. The second sequence can optionally contain encrypted voting information encrypted in the public key of the repository or peer node responsible for counting votes, such as an encrypted peer secret share or approvals indicating the endorsement by the peer agents of the message payload and its stated content. The sequence of nested signatures can be verified in later processing.

The receiving peer accepts the list of prior peer identities and adds 908 its KNAP credential and identity. Optionally, the peer may attach or add to encrypted data 506. The NSM is then ready for substitution 910 of the current peer's signature 510.

A test 912 is applied by the receiving peer which determines whether said peer is to be the final recipient of the NSM. This may be indicated in the header list of receiving peers or by a special marker in the message header or by out-of-band sequencing information. If so, NSM verification will proceed and the originating peer will be notified 911. If not, the receiving peer will create a new or successor NSM body instance 913 that will be sent on to the next peer in the header list or made explicit in out-of-band communications, and the peer sends the signed NSM body to the next peer on the routing list through network 208, at which point the next receiving peer repeats the relevant steps of the method.

Embodiments of the present invention may be implemented in hardware, or as software modules running on one or more processors, or in a combination thereof. That is, those skilled in the art will appreciate that special hardware circuits such as trusted computing bases, or the Apple T2 chip, may be used in practice to implement some or all of the functionality of all components of the present invention. It should be noted that the described embodiments are exemplary rather than limiting the present invention. Substitute embodiments may be designed by those skilled in the art without departing from the scope of the claims enclosed.

The invention claimed is:

1. A method for secure voting among M peers in a channel on an action proposal, comprising:
 a) selecting a secret $\mathcal{S}$;
 b) dividing the secret $\mathcal{S}$ into M unique shares by using a threshold secret sharing scheme;
 c) providing M hardware security modules with secure storage and firmware;
 d) provisioning each of said M hardware security modules with a distinct one of the M unique shares, and the secret $\mathcal{S}$, and storing said distinct unique share and secret $\mathcal{S}$ in the hardware security module's secure storage;
 e) controlling login to each said provisioned hardware security module as a function of that hardware security module's provisioned distinct unique share;
 enabling calculation of a trial secret $\mathcal{S}'$ as a function of that hardware security module's provisioned distinct unique share;
 g) further enabling each of the M hardware security modules to compare the trial secret $\mathcal{S}'$ with the stored provisioned secret $\mathcal{S}$ and if identical, to compute a credential by concatenation of a nonce with the provisioned secret $\mathcal{S}$ and one or more identity factors to create a concatenation value, and thereafter computing a one-way hash of the concatenation value, resulting in a KNAP credential;
 h) assigning each of the provisioned and enabled hardware security modules to a distinct one of the M peers;
 i) facilitating the transmission of the action proposal from one of the M peers, together with that peer's KNAP credential, identity factors, and the nonce used to compute said KNAP credential to all other peers in the channel;
 j) still further enabling each of the M peers to authenticate the received action proposal using the sender's KNAP credential, and transmitted identity factors and nonce;
 k) receiving a vote on the action proposal from one of the M peers; and
 l) recording said vote in a distributed ledger.

2. The method of claim 1 where the firmware of the M hardware security modules can be changed by an authenticated trusted party so that the secret $\mathcal{S}$ is maintained.

3. The method of claim 1 where the assigning step further includes authentication of the identity of each peer.

4. The method of claim 1, where the second enabling step further comprises hashing the secret $\mathcal{S}$ before it is concatenated with the nonce.

5. The method of claim 1, where the one or more identity factors are chosen from the group comprising the channel object identity, the peer identification of the sender of the action proposal, a timestamp, the peer's current voting status, and an identifier for a vote.

6. The method of claim 1, where order of voting is enforced by a nested signature message.

7. The method of claim 6 where the nested signature message comprises the KNAP credential of the provisioning step.

* * * * *